United States Patent
Sherwood et al.

(10) Patent No.: US 6,713,125 B1
(45) Date of Patent: Mar. 30, 2004

(54) INFILTRATION OF THREE-DIMENSIONAL OBJECTS FORMED BY SOLID FREEFORM FABRICATION

(75) Inventors: Michael Thomas Sherwood, Agoura Hills, CA (US); Pingyong Xu, Valencia, CA (US)

(73) Assignee: 3D Systems, Inc., Valencia, CA (US)

( * ) Notice: Subject to any disclaimer, the term of this patent is extended or adjusted under 35 U.S.C. 154(b) by 6 days.

(21) Appl. No.: 10/099,839

(22) Filed: Mar. 13, 2002

(51) Int. Cl.$^7$ .............................. B05D 5/06; B05D 1/18; B05D 1/02
(52) U.S. Cl. .................... 427/157; 427/430.1; 427/421; 427/256
(58) Field of Search .............................. 427/430.1, 421, 427/256, 157

(56) References Cited

U.S. PATENT DOCUMENTS

| | | | |
|---|---|---|---|
| 4,157,892 A | * 6/1979 | Tanaka et al. ................ | 8/507 |
| 4,575,330 A | 3/1986 | Hull | |
| 4,690,858 A | * 9/1987 | Oka et al. .................... | 428/216 |
| 4,752,352 A | 6/1988 | Feygin | |
| 4,820,310 A | * 4/1989 | Fukui ........................... | 8/456 |
| 4,863,538 A | 9/1989 | Deckard | |
| 5,053,079 A | 10/1991 | Haxell et al. | |
| 5,136,515 A | 8/1992 | Helinski | |
| 5,149,548 A | 9/1992 | Yamane et al. | |
| 5,192,469 A | 3/1993 | Smalley et al. | |
| 5,204,055 A | 4/1993 | Sachs et al. | |
| 5,216,616 A | 6/1993 | Masters | |

(List continued on next page.)

FOREIGN PATENT DOCUMENTS

| | | |
|---|---|---|
| EP | 0 812 889 A2 | 12/1997 |
| EP | 0 867 487 A2 | 9/1998 |
| EP | 0 869 161 A2 | 10/1998 |
| JP | 61-88106 | 5/1986 |
| JP | 2000-177016 | 6/2000 |
| JP | 2000-177017 | 6/2000 |
| JP | 2000-177019 | 6/2000 |
| JP | 2000-246804 | 9/2000 |
| JP | 2000-280355 | 10/2000 |
| JP | 2000-280356 | 10/2000 |
| JP | 2000-280357 | 10/2000 |
| WO | WO 97/04964 | 2/1997 |
| WO | WO 97/11837 | 4/1997 |
| WO | WO 97/13816 | 4/1997 |
| WO | WO 97/31071 | 8/1997 |
| WO | WO 97/33943 | 9/1997 |
| WO | WO 01/26023 A1 | 4/2001 |

OTHER PUBLICATIONS

Derwent patent abstract of KR 2002012819 A by Jang et al., Feb. 2002.*

University of Buffalo, State University of New York, "Rapid Color Protoptyping [sic]," University at Buffalo Docket: R–5555, undated.

U.S. patent application No. 09/970,727, filed Oct. 3, 2001 by Newell et a.

U.S. patent application No. 09/971,247, filed Oct. 3, 2001, by Schmidt et al.

U.S. patent application No. 09/971,337, filed Oct. 3, 2001 by Schmidt.

*Primary Examiner*—Michael Barr
(74) *Attorney, Agent, or Firm*—James E. Curry; Ralph D'Alessandro

(57) ABSTRACT

A method for processing a three-dimensional object formed by solid freeform fabrication from a build material having a polymer component to alter the appearance of the object. A fluid medium carrying an infiltration agent is applied to the object at a temperature above the glass transition temperature of the polymer component for a desired period of time wherein the infiltration agent penetrates the three-dimensional object. The infiltration agent can be a dye that can alter the color of the object.

16 Claims, 1 Drawing Sheet

U.S. PATENT DOCUMENTS

| | | | |
|---|---|---|---|
| 5,221,335 A | 6/1993 | Williams et al. | |
| 5,260,009 A | 11/1993 | Penn | |
| 5,340,433 A | 8/1994 | Crump | |
| 5,409,750 A * | 4/1995 | Hamada et al. | 428/35.7 |
| 5,481,470 A | 1/1996 | Snead et al. | |
| 5,514,232 A | 5/1996 | Burns | |
| 5,514,519 A | 5/1996 | Neckers | |
| 5,555,176 A * | 9/1996 | Menhennett et al. | 700/118 |
| 5,677,107 A | 10/1997 | Neckers | |
| 5,788,751 A | 8/1998 | Sawada | |
| 5,866,058 A | 2/1999 | Batchelder et al. | |
| 5,879,489 A | 3/1999 | Burns et al. | |
| 5,902,538 A | 5/1999 | Kruger et al. | |
| 5,932,309 A | 8/1999 | Smith et al. | |
| 5,942,370 A | 8/1999 | Neckers | |
| 5,945,058 A | 8/1999 | Manners et al. | |
| 5,988,862 A | 11/1999 | Kacyra et al. | |
| 5,999,184 A | 12/1999 | Smalley et al. | |
| 6,007,318 A | 12/1999 | Russell et al. | |
| 6,029,096 A | 2/2000 | Manners et al. | |
| 6,036,910 A | 3/2000 | Tamura et al. | |
| 6,074,742 A | 6/2000 | Smith et al. | |
| 6,084,980 A | 7/2000 | Nguyen et al. | |
| 6,132,665 A | 10/2000 | Bui et al. | |
| 6,165,406 A | 12/2000 | Jang et al. | |
| 6,175,422 B1 | 1/2001 | Penn et al. | |
| 6,197,843 B1 | 3/2001 | Rose et al. | |
| 6,200,646 B1 | 3/2001 | Neckers et al. | |
| 6,253,116 B1 | 6/2001 | Zhang et al. | |
| 6,259,962 B1 | 7/2001 | Gothait | |
| 6,309,797 B1 | 10/2001 | Grinevich et al. | |
| 6,324,438 B1 | 11/2001 | Cormier et al. | |

* cited by examiner

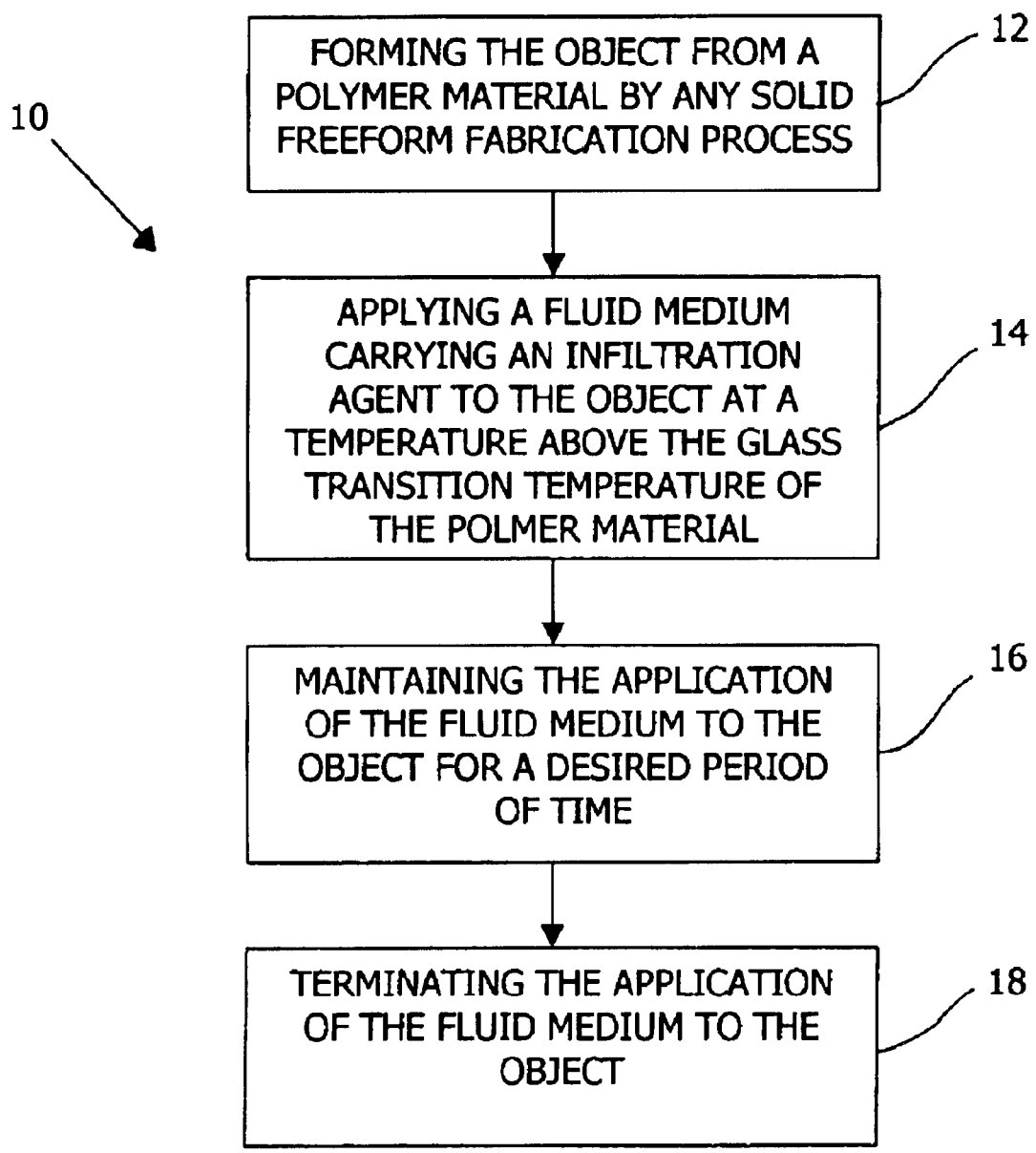

600# INFILTRATION OF THREE-DIMENSIONAL OBJECTS FORMED BY SOLID FREEFORM FABRICATION

BACKGROUND OF THE INVENTION

1. Field of the Invention

The invention relates in general to solid freeform fabrication and, in particular, to an infiltration technique that alters the appearance of a three-dimensional object formed by a solid freeform fabrication apparatus.

2. Description of the Prior Art

Recently, several new technologies have been developed for the rapid creation of models, prototypes, and parts for limited run manufacturing. These new technologies are generally called Solid Freeform Fabrication techniques, and are herein referred to as "SFF." Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to conventional fabrication techniques, which are generally subtractive in nature. For example, in most conventional fabrication techniques material is removed by machining operations or shaped in a die or mold to near net shape and trimmed. In contrast, additive fabrication techniques incrementally add portions of a build material to targeted locations, layer by layer, in order to build a complex part. SFF technologies typically utilize a computer graphic representation of a part and a supply of a building material to fabricate the part in successive layers. SFF technologies have many advantages over conventional manufacturing methods. For instance, SFF technologies dramatically shorten the time to develop prototype parts and can produce limited numbers of parts in rapid manufacturing processes. They also eliminate the need for complex tooling and machining associated with conventional subtractive manufacturing methods, including the need to create molds for custom applications. In addition, customized objects can be directly produced from computer graphic data in SFF techniques.

Generally, in most SFF techniques, structures are formed in a layer by layer manner by solidifying or curing successive layers of a build material. SFF techniques generally fall into the following sub-categories: stereolithography, selective deposition modeling, laminated object manufacturing, and laser sintering. For example, in stereolithography a tightly focused beam of energy, typically in the ultraviolet radiation band, is scanned across a layer of a liquid photopolymer resin to selectively cure the resin to form a structure as described in, for example U.S. Pat. No. 4,575,330 to Hull. Somewhat similar to stereolithography is selective laser sintering where heat generated from a laser is used to fuse powder particles together to form an object in a layer by layer manner, as described in, for example U.S. Pat. No. 4,863,538 to Deckard. In one form of laminated object manufacturing objects are constructed by the successive deposition of thin layers of metal or plastic powder which is compressed and then sintered with a laser as described in, for example, U.S. Pat. No. 4,762,352 to Feygin. In another form of laminated object manufacturing, successive sheets of a plastic substrate are adhesively bonded in layers with a solvent as described in U.S. Pat. No. 6,324,438 to Cormier. In Selective Deposition Modeling, herein referred to as "SDM," a build material is typically jetted or dropped in discrete droplets, or extruded through a nozzle, in order to solidify on contact with a build platform or previous layer of solidified material in order to build up a three-dimensional object in a layerwise fashion. Other synonymous names for SDM which are used in this industry are solid object imaging, solid object modeling, fused deposition modeling, selective phase area deposition, multi-phase jet modeling, three-dimensional printing, thermal stereolithography. selective phase area deposition, ballistic particle manufacturing, fused deposition modeling, and the like. Ballistic particle manufacturing is disclosed in, for example, U.S. Pat. No. 5,216,616 to Masters. Fused deposition modeling is disclosed in, for example, U.S. Pat. No. 5,340,433 to Crump. Three-dimensional printing is disclosed in, for example, U.S. Pat. No. 5,204,055 to Sachs et al. Often a thermoplastic material having a low-melting point is used as the solid modeling material in SDM, which is delivered through a letting system such as an extruder or print head. One type of SDM process which extrudes a thermoplastic material is described in, for example, U.S. Pat. No. 5,866,058 to Batchelder et al. One type of SDM process utilizing a printer to selectively dispense a liquid binder on a layer of powder is described in, for example, U.S. Pat. No. 6,007,318 to Russell, et. al. One type of SDM process utilizing ink jet print heads is described in, for example, U.S. Pat. No. 5,555,176 to Menhennett et al. Some thermoplastic build materials used in SDM are available and sold under the names ThermoJet® 2000 and ThermoJet® 88 by 3D Systems, Inc. of Valencia, Calif. Also, some formulations for thermoplastic phase change build materials are disclosed in U.S. Pat. No. 6,132,665 to Bui et al.

Recently, there has developed an interest in utilizing curable phase change materials in SDM. One of the first suggestions of using a radiation curable build material in SDM is found in U.S. Pat. No. 5,136,515 to Helinski, wherein it is proposed to selectively dispense a UV curable build material in an SDM system. Some of the first UV curable material formulations proposed for use in SDM systems are found in Appendix A of International Patent Publication No. WO 97/11837, where three reactive material compositions are provided. More recent teachings of using curable materials in three-dimensional printing are provided in U.S. Pat. No. 6,259,962 to Gothait and in International Publication Number WO 01/26023.

However, one inherent drawback of using curable build materials in SFF techniques such as stereolithography and selective deposition modeling is the inability to produce objects exhibiting a wide variety of colors. For instance, coloring agents introduced into a UV curable resin tend to block the penetration of UV radiation necessary to solidify the material. Thus, in order to produce colored objects, it is often necessary to manually paint the surface of the objects to the appropriate color after they have been formed by an SFF apparatus.

Thus, there is a need to develop an improved method to change the appearance of objects formed by SFF. These and other difficulties of the prior art have been overcome according to the present invention.

BRIEF SUMMARY OF THE INVENTION

The present invention provides its benefits across a broad spectrum. While the description which follows hereinafter is meant to be representative of a number of such applications, it is not exhaustive. As will be understood, the basic methods and compositions taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to process objects formed by any solid freeform fabrication apparatus so as to introduce an infiltration agent capable of altering the appearance of the objects.

It is a feature of the present invention to process objects formed by any solid freeform fabrication apparatus by submersing the object in a fluid containing an infiltration agent at a temperature above the glass transition temperature ($T_g$) of a polymer component of the object.

It is an advantage of the present invention that objects formed by any solid freeform fabrication technique containing a polymer material can be infiltrated with a colorant.

These and other aspects, features, and advantages are achieved/attained according to the present invention of producing a visually altered article initially formed by a solid freeform fabrication apparatus. The method comprises:

applying a fluid medium to the three-dimensional object at a temperature above the glass transition temperature of the polymer component, the fluid medium carrying an infiltration agent and permeating the three-dimensional object at a temperature above a glass transition temperature of the polymer component;

maintaining the application of the fluid medium to the three-dimensional object for a desired period of time to allow the infiltration agent to penetrate the three-dimensional object and establish a desired appearance of the three-dimensional object; and terminating the application of the fluid carrying the infiltration agent to the three-dimensional object.

A fluid composition for use in altering the appearance of three-dimensional objects comprises an oil-based component and infiltration agent. The oil-based component permeates the three-dimensional object when in contact with the three-dimensional object at a temperature above a glass transition temperature of the polymer component in the object. The infiltration agent is dispersed in the oil-based component and penetrates the three-dimensional object during processing to alter the appearance of the three-dimensional object.

BRIEF DESCRIPTION OF THE DRAWINGS

The aspects, features, and advantages of the present invention will become apparent upon consideration of the following detailed disclosure of the invention, especially when it is taken in conjunction with the accompanying drawing wherein:

The FIGURE is a flow chart of an embodiment of the processing method of the present invention.

To facilitate understanding, identical reference numerals have been used, where possible, to designate identical elements that are common in the FIGURES.

DETAILED DESCRIPTION OF THE PREFERRED EMBODIMENTS

While the present invention is applicable to all SFF techniques and objects made therefrom, the invention will be described with respect to an article formed by an SDM technique utilizing an ink Jet print head dispensing a ultra-violet radiation curable phase change material. However, it is to be appreciated that the present invention can be implemented with any SFF technique utilizing any thermoplastic or thermosetting polymer material. For example, a polymer material can be used that is cured by exposure to radiation having wavelengths other than in the ultraviolet band of the spectrum, or by subjecting the material to thermal radiation, or by chemical reaction.

As used herein, a "solid freeform fabrication apparatus" is any apparatus that forms three-dimensional objects in a layerwise manner in an additive fashion. Some categories of SFF techniques include stereolithography, selective deposition modeling, laminated object manufacturing, and laser sintering. As used herein, a "build material" refers to any material used by a solid freeform fabrication apparatus to form a solidified three-dimensional object in a layerwise manner. A build material may initially be in a flowable state such as a liquid, powder, paste, or gel prior to being solidified to form a three-dimensional object. The terms "solidified" or "solidifiable" as used herein refer to the characteristics of a build material where the material transforms from the flowable state to a non-flowable state, which is typically induced by a solid freeform fabrication apparatus to form an object. A wax-based phase change material, a photocurable material, a thermosetting material, and a powder and binder reacted material, are examples of solidifiable build materials. In addition the term "polymer component" refers to any thermoplastic or thermosetting natural or synthetic compound present in a build material. A polymer component typically has a high molecular weight and consists of numerous repeated linked units, each a relatively light and simple molecule. Examples of thermosetting polymer components suitable for solidification by photo-polymerization include epoxies, acrylates, vinyl ethers, unsaturated polyesters, bismaleimides, and combinations thereof. Examples of thermoplastic polymer components suitable for solidification by thermal-polymerization include nylon, carbon-hydrogen waxes, acrylics, ABS (Acrylonitrile Butadiene Styrene), polyimide resins, polycarbonates, polyurethanes, and combinations thereof. Further the term "glass transition temperature" ($T_g$) refers to the temperature at which a particular polymer component transitions from a solid (glass) state to an elastic state. For polymers, the glass transition temperature is typically provided by the supplier of the particular polymer as the value varies among different polymer formulations. However, the glass transition temperature can also be determined for any polymer by using differential scanning calorimetry.

Preferred build and support materials for forming objects by selective deposition modeling are disclosed in U.S. patent application Ser. No. 09/971,247 filed Oct. 3, 2001, which is herein incorporated by reference as set forth in full. The materials have a melting point from about 45° C. to about 65° C., a freezing point from about 33° C. to about 60° C., and a jetting viscosity of about 10 to about 16 centipoise and a dispensing temperature of about 80° C.

In general, the materials are dispensed in a layerwise manner during the SDM build process, and a planarizer is driven over each layer to normalize the layers. The build material is a photocurable acrylate/wax blend, and the support material is primarily a wax. After all the layers are formed, the support material can be removed by heating the object and support structure above the melting point of the support material, causing the support material to melt away. A method and apparatus for dispensing the preferred materials to form the three-dimensional object and its underlying support structure are disclosed in U.S. patent application Ser. No. 09/971,337 filed on Oct. 3, 2001, which is herein incorporated by reference as set forth in full. The preferred dispensing temperature is about 80° C. A method for removing the support material is disclosed in U.S. patent application Ser. No. 09/970,727 filed on Oct. 3, 2001.

Four build material formulations are provided by weight percent in Table 1. The formulation shown in Example 4 is preferred since it is the most durable. The physical properties of the formulations are shown in Table 2.

TABLE 1

| Mfg. ID No. | General Component Name | Ex. 1 | Ex. 2 | Ex. 3 | Ex. 4 |
|---|---|---|---|---|---|
| CN980 | Urethane Acrylate | 7.2% | | | 6.5% |
| CN981 | Urethane Acrylate | | | 26% | |
| E3200 | Epoxy Acrylate | | | 14% | 6.0% |
| CN975 | Hexa-functional Urethane Acrylate | | 7.2% | | |
| CN2901 | Urethane Acrylate | 27.5% | 27% | | 18.7% |
| SR203 | Tetrahydro-furfuryl Methacrylate | | | | |
| SR205 | Triethylene glycol di-methacrylate | 33% | | 46.5% | 41.05% |
| SR340 | 2-phenoxy-ethyl methacrylate | | | | |
| SR313 | Lauryl methacrylate | | 18% | | |
| SR454 | Ethoxylated₃ Trimethylol-propane Triacrylate | | 4.5% | | |
| SR604 | poly-propylene glycol mono-methacrylate | | | | 12.0% |
| CD406 | Cyclohexane dimethanol diacrylate | | 30% | | |
| SR493D | Tridecyl Methacrylate | 19% | | | |
| ADS038 | Urethane wax | 7% | 5.3% | 10% | 10.0% |
| ADS043 | Urethane wax | 4.3% | 6% | 1.5% | 2.0% |
| I-184 | Photo-initiator | 2% | 2% | 2% | 3.75% |
| TOTAL | | 100% | 100% | 100% | 100.0% |

TABLE 2

| Property | Ex. 1 | Ex. 2 | Ex. 3 | Ex. 4 |
|---|---|---|---|---|
| Viscosity at 80° C. | 12.9 cps | 12.9 cps | 12.9 cps | 12.8 cps |
| Melting point ° C. | 52° C. | 55° C. | 57° C. | 56° C. |
| Freezing point ° C. | 46° C. | 47.5° C. | 50° C. | 49.5° C. |
| Elongation % E (after cure) | 9% | 4% | 5% | 11.3% |

The following components used in the four formulations listed in Table 1 are available from the Sartomer Company, Inc. of Exton, Pa., under the following designations: CN 980, CN 981, CN 975, CN2901, SR 203, SR 205, SR 340, SR 313, SR 454, CD 406, SR604, and SR 493D. The components ADS 038 and ADS 043 are available from American Dye Source, Inc. of Quebec, Canada. The epoxy acrylate under the designation E 3200 is available from UCB Chemical, Inc. of Atlanta, Ga. The photoinitiator under the designation I-184 is available from Ciba Specialty Chemicals, Inc. of New York, N.Y.

The build material formulations in Table 1 contain between about 5% to about 25% by weight of a non-reactive wax. In the preferred build material, the non-reactive wax content is between about 10% to about 12% by weight and is comprised of a urethane wax. However, other non-reactive waxes could be used such as carbon hydrogenated waxes, paraffin waxes, fatty ester waxes, and the like. The wax content, or phase change component, provides the appropriate phase change characteristics of the build material so that the material will solidify after being dispensed from an ink jet print head. This wax, which does not cure when exposed to actinic radiation, is trapped within the cured matrix of the polymerized reactive components of the build material formulation.

The preferred non-curable phase change support material comprises about 70% by weight octadecanol available from Ruger Chemical Co., Inc., of Irvington, N.J., and about 30% by weight of a tackifier sold under the designation of KE 100 available from Arakawa Chemical (USA) Inc., of Chicago, Ill. This support material formulation has a viscosity of about 11.0 centipoise at a temperature of about 80° C., and a melting point of about 58° C. and a freezing point of about 49.5° C.

Test specimens were formed by an SDM apparatus utilizing the piezoelectric Z850 print head used in the Phaser® 850 printer available from Xerox Corporation's Office Products Business Unit of Wilsonville, Oreg. The Z850 print head was configured to dispense the non-curable phase change support material as well as the curable phase change build material. The Z850 print head was modified to dispense the materials at a temperature of about 80° C. Both materials solidified generally upon contact in the layer being formed during the build process, and after each layer was formed the layers were cured by exposure to actinic radiation. Only the reactive polymers in the dispensed build material were cured by the exposure to actinic radiation which initiated the polymerization reaction. Hence, the test specimens comprised a matrix of cured build material dispersed with between about 5% to about 25% by weight of a non-reactive wax, and the matrix being partially surrounded by solidified support material.

The test specimens were used in order to develop an optimum method for removing the support material. Generally it was preferred to develop a method relying on heat to bring the support material back to a flowable state, in effect to melt the support material away from the three-dimensional object. A number of expedients were tried using a heated fluid medium to melt away the support material, as discussed in greater detail in U.S. patent application Ser. No. 09/970,727, filed Oct. 3, 2001 which is herein incorporated by reference as set forth in full, it was determined from these initial expedients that the fluid medium had to cross the freezing point of the wax component of the build material in a slow and even manner to prevent wax migration.

Initial expedients utilized steam, solvents, and oils, in order to develop an appropriate method of removing the support material with a fluid medium without adversely affecting the three-dimensional object. Further investigations were conducted to find an acceptable non-toxic, environmentally friendly fluid medium for use in removing the support material. It was proposed that non-toxic, environmentally friendly fatty acid esters would be suitable fluid mediums. Such fatty acid esters are derived from organic oil-based fluids such as linseed oil, soybean oil, castor oil, sunflower seed oil, tall oil, tung oil, corn oil, rapeseed oil, and the like. A soybean-based fatty acid ester was initially selected since it is readily available and relatively inexpensive. Experiments were conducted with soybean-based fatty acid esters comprising methyl esters. Two soybean solvents sold under the names Soyclear® 1500 and Soygold® 2000 by A.G. Environmental Products LLC, of Lenexa, Kans., produced excellent results in removing the support material. Further the solvent did not discolor or otherwise adversely affect the underlying three-dimensional object when removing the support material.

Unexpectedly, it was discovered that, when using Soygold® 2000 or Soyclear® 1500 as the heat transferring fluid medium, it was not necessary to cross the freezing point of the wax component of the build material in a slow and even manner to prevent wax migration causing adverse discoloration. Instead, the temperature could be rapidly reduced past the freezing point of the wax component with no effect on the appearance of the part. It is believed that this beneficial phenomenon occurs because the soy solvent penetrates the object and plasticizes the wax component in the object at elevated temperatures, which prevents the wax from migrating during uneven cooling. Thus, fatty acid esters that penetrate and partially dissolve the wax component of the build material eliminate the need to slowly lower the temperature of the fluid medium when crossing the freezing point of the wax component of the build material. It is believed that this penetration occurs when the fluid medium and object are at or above the glass transition temperature of the polymer component in the build material.

Upon the belief that the soybean solvent penetrates the acrylate/wax matrix, it was decided to introduce an infiltration agent such as a colored dye into the soybean solvent to see if the dye would penetrate the object during the support material removal process. Unexpectedly, brilliantly colored SFF objects were created using polymeric dye colorants as the infiltration agent, which are not otherwise producible directly by SFF techniques alone. Comparative sample objects were processed with a variety of different dyes that resulted in the creation of bright red, blue, and yellow objects. In addition, dark black objects not otherwise producible in SFF were also created. These bright colored sample objects demonstrated that fatty acid esters substantially penetrate the surface of the object at temperatures above the glass transition temperature of the polymer component of the build material, and when combined with infiltration agents such as dyes, can alter the visual appearance of the objects.

Referring to the FIGURE, the method of the present invention is shown generally by numeral 10 in flow chart form. First, as indicated by numeral 12, the method involves forming a three-dimensional object from a build material containing a polymer component by any solid freeform fabrication process. Generally, the only requirement of the process is that it be an additive process, as discussed previously. The SFF apparatus that forms the three-dimensional object may be a stereolithography apparatus selective deposition modeling apparatus, a laminated object manufacturing apparatus, a laser sintering apparatus, and the like. The apparatus may also a hybrid that incorporates any combination of the SFF techniques discussed herein. The build material contra the polymer component may take the form of a solid, a liquid, a semi-solid, a powder, a paste, or a gel prior to being used to form the three-dimensional object, but must be solidified to form the object. Some suitable build materials are wax-based phase change materials, photocurable materials, thermosetting materials, and powder/binder reaction materials, and combinations thereof.

Next, the method involves applying a fluid medium to the three-dimensional object at a temperature above the glass transition temperature of the polymer component of the build material, as indicated by numeral 14. Preferably the three-dimensional object is submersed in a bath of the fluid medium, or alternatively, the fluid medium is sprayed on the three-dimensional object. The fluid medium carries an infiltration agent that is selected to after the appearance of the three-dimensional object during the process. When processing SDM objects, the fluid medium may comprise alcohols, ketones, esters, pyrrolidinone, and combinations thereof. The infiltration agent is soluble in the fluid medium and penetrates the object during application of the fluid medium. The infiltration agent is selected so as to establish a desired appearance of the three-dimensional object.

The infiltration agent may be any colorant that is soluble in the selected fluid medium. The colorant may exhibit the characteristics of being iridescent, fluorescent, phosphorescent, or conductive. In addition, the colorant can be selected from the color group consisting of cyan, magenta, yellow, black, and combinations thereof to produce any desired color. The dyes may be dyes from the following dye classes: Color Index (C.I.) dyes; solvent dyes, disperse dyes, modified acid and direct dyes; and basic dyes. Polymeric dye colorants may also be used such as those available from Milliken & Company. Examples include Milliken Ink Blue 92, Milliken Ink Red 357, Milliken Ink Yellow 1800, and Milliken Ink Black 8915-67, certain of which contain a class of chromophores containing polyozyalkylene substitution and reactive hydroxyl functionality. Other yellow, cyan, magenta and black polymeric dyes may be used alone or in combination with conventional colorants such as those disclosed in U.S. Pat. No. 5,372,852. Examples of solvent soluble dyes that can be used are the solid and liquid line of dyes sold under the Saviny® product line available from Clariant GmbH, Pigments & Additives Division, of Frankfurt, Germany which are soluble in fluid mediums containing alcohols, ketones and esters.

The application of the fluid medium to the three-dimensional object is maintained for a desired period of time as indicated by numeral 16. The time period will vary depending on the desired appearance, the shape and size of the object, and on the rate at which the infiltration agent is able to penetrate the object. If the object were formed by SDM, the fluid medium can be used to simultaneously remove residual support material while the infiltration agent penetrates the object, provided this temperature is above the melting point of the support material. Generally, the longer the object is subjected to the application of the fluid medium, the greater the penetration of the infiltration agent into the object.

After the desired period of time, the application of the fluid medium to the object is terminated, as indicated by numeral 18. When submersing the object in a bath of the fluid medium, this is accomplished by removing the object from the bath. When spraying the object with the fluid medium, this is accomplished by halting the spray.

It is to be appreciated that the fluid medium may be selectively applied to only a portion of the three-dimensional object to alter the appearance of the surface of the three-dimensional object to which the fluid medium is selectively applied. The three-dimensional object could then be subjected to the process again, but with a different infiltration agent, so as to produce a three-dimensional object having a variety of different visual effects.

The infiltration agent may also impart conductive properties on the object, such as occurs when using a metal oxide dye. In addition, the infiltration agent may also be phosphorescent, thereby emitting light following exposure to incident radiation, if desired.

A surfactant additive may also be added to the fluid medium for enhancing the penetration of the infiltration agent in the three-dimensional object during processing. One surfactant sold under the name of fast acting Ultra Dawn® available from The Proctor & Gamble Company of Cincinnati, Ohio, whose active ingredient is triclosan, was used in conjunction with soy solvent to enhance the penetration of the infiltration agent in the three-dimensional object.

The following sample objects are illustrative of the three-dimensional objects formed by solid freeform fabrication which were processed according to the present invention. The following disclosure of these sample objects formed by various solid freeform fabrication techniques is provided without any intent to limit the invention to the specific materials, process, or structure employed.

COMPARATIVE SDM SAMPLE OBJECTS

Comparative sample objects were formed by an SDM apparatus utilizing the Z850 print head as discussed previously. The curable phase change build material in Example 4 of table 1 was dispensed to form the objects, and the support material discussed previously was dispensed to form the supports for the objects as needed. The geometry of the initial sample objects formed comprised a 3"×2" hollow flow valve and a 3"×2" cell phone shell which were selected as representative of difficult structures in which to process to remove the support material. An initial bulk left of the support material was achieved by placing the objects with integral supports into an oven at a temperature of about 85° C. for approximately 20 minutes. The initial bulk melt removed substantially all of the support material from the sample objects, leaving a residual amount of support material on the sample objects. The sample objects were removed from the oven and allowed to return to ambient temperature. The sample objects generally appeared opaque white with a slight shade of yellow. The glass transition temperature of the cured polymer component in these sample objects was determined to be between about 45° C. and about 65° C.

The sample objects were used for further processing according to the present invention so as to introduce a variety of infiltration agents into the objects while removing the residual support material that remained after the bulk melt. Various methods of providing physical agitation to the fluid medium were also used to optimize the removal of residual support material in small orifices and cavities such as ultrasonic stimulation. Physical agitation of the fluid medium, however, is not necessary to infiltrate objects already cleaned free of support material. A number of sample SDM objects were processed in Examples 1 through 6.

COMPARATIVE STEREOLITHOGRAPHY SAMPLE OBJECTS

Sample objects were also made on a stereolithography apparatus from a ultraviolet (UV) curable build material. The geometry of some of the objects formed comprised a 6"×4" clothing iron shell structure approximately 0.125" thick. The geometry of some other of the objects comprised a 2"×2" flat sheet approximately 0.060 thick. The build material used was the SL 7540 build material available from 3D Systems, Inc. of Valencia, Calif. The sample objects were formed from this build material on a stereolithography apparatus. An SLA® 5000 imaging system available from 3D Systems, Inc. was used. The sample objects formed had a glass transition temperature of between about 49° C. to about 52° C. The sample parts appeared translucent yellow. The sample stereolithography objects formed were processed according to Examples 7 and 8.

COMPARATIVE LASER SINTERING SAMPLE OBJECTS

Sample laser sintering objects were made on a Vanguard SLS® system available from 3D Systems, of Valencia, Calif. This selective laser sintering system creates three-dimensional objects, layer by layer, from powdered materials with a heat generated from a $CO^2$ laser. The laser sintering objects formed were a finger exercise device having two opposed handles connected in a V-configuration. The handles had a generally U-shaped cross-section with a thickness of approximately 0.125", and the V-configuration connecting the handles had a thickness of approximately 0.30". The sample laser sintering exercise device was made from a thermoplastic polyamide powder build material sold under the DuraForm® product line of nylon powders available from 3D Systems, Inc. The objects formed are believed to have had a glass transition temperature of between about 40° C. to about 58° C. The laser sintering sample objects appeared bright opaque white. The sample laser sintering objects formed were processed according to Example 9.

The following examples are illustrative of infiltration processing of the three-dimensional objects formed by solid freeform fabrication without any intent to limit the invention to the specific materials, process, or structure employed. These examples refer to processing the sample parts formed as discussed above.

EXAMPLE 1

Red SDM Object

A solvent soluble dye sold under the name Orasol® Red available from Ciba-Geigy Specialty Chemicals Corporation of Tarrytown, N.Y., was mixed in a concentration of about one teaspoon per 500 ml of soy solvent. The soy solvent Soygold® 2000 was used. The fluid medium comprising soy solvent and dye was placed in a heated vat maintained at a temperature of between about 45° C. and about 80° C. which is above the glass transition temperature of the polymer component of the sample parts. The cell phone shell and hollow flow valve were used as the sample parts. The SDM sample parts were submersed into the vat and held in the vat for approximately 24 hours before being removed and returned to room temperature. The parts were washed in warm soapy water and rinsed and dried. The SDM sample parts changed from their generally opaque white appearance to a uniform bright red. Some of the sample parts were cut in half which revealed that the dye penetrates the surface of the parts and generally penetrates and colorizes the entire internal volume of the part. Further, the dye remained inert in the parts and did not come off on the hands of persons handling the parts.

EXAMPLE 2

Yellow SDM Object

A solid dye soluble in a thermoplastic sold under the color designation Potomac Yellow YP-20-A available from Day- Glo Color Corporation of Cleveland, Ohio, was mixed in a concentration of about one teaspoon per 500 ml of soy solvent. The soy solvent Soygold® 2000 was used. The fluid medium comprising soy solvent and dye was placed in a heated vat maintained at a temperature of between about 45° C. and about 80° C. which is above the glass transition temperature of the polymer component of the sample parts. The cell phone shell and hollow flow valve were used as the sample parts. The SDM sample parts were submersed into the vat and held in the vat for approximately 60 minutes before being removed and returned to room temperature. The parts were washed in warm soapy water and rinsed and dried. The sample parts changed from their generally opaque white appearance to a uniform bright yellow. The dye did not come off on the hands of persons handling the parts.

EXAMPLE 3

Pink SDM Object

A solid dye solution sold under the color designation Aurora Pink HM-11 available from Day-Glo Color Corporation of Cleveland, Ohio, was mixed in a concentration of about one teaspoon per 500 ml of soy solvent. The soy solvent Soygold® 2000 was used. The fluid medium comprising soy solvent and dye was placed in a heated vat maintained at a temperature of between about 45° C. and about 80° C. which is above the glass transition temperature of the polymer component of the sample parts. The cell phone shell and hollow flow valve were used as the sample parts. The SDM sample parts were submersed into the vat and held in the vat for approximately 45 minutes before being removed and returned to room temperature. The parts were washed in warm soapy water and rinsed and dried. The sample parts changed from their generally opaque white appearance to a uniform bright pink. The dye did not come off on the hands of persons handling the parts.

EXAMPLE 4

Blue SDM Object

A soluble dye sold under the designation Oil Blue II available from Keystone Corporation of Santa Fe, Calif., was mixed in a concentration of about one teaspoon per 500 ml of soy solvent. The soy solvent Soygold® 2000 was used. The fluid medium comprising soy solvent and dye was placed in a heated vat maintained at a temperature of between about 45° C. and about 80° C. which is above the glass transition temperature of the polymer component of the sample parts. The cell phone shell and hollow flow valve were used as the sample parts. The SDM sample parts were then submersed into the vat and held in the vat for approximately 120 minutes before being removed and returned to room temperature. The parts were washed in warm soapy water and rinsed and dried. The sample parts changed from their generally opaque white appearance to a uniform bright blue. The dye did not come off on the hands of persons handling the parts.

EXAMPLE 5

Green SDM Object

A blue SDM object established as described in example 4 was further processed to form a green object. Potomac Yellow YP-20-A available from Day-Glo Color Corporation of Cleveland, Ohio, was mixed in a concentration of about one teaspoon per 500 ml of soy solvent, as discussed in example 2. The fluid medium was then brought to about 55° C. in a vat, and a blue SDM object was then placed in the vat. The blue SDM object was a blue hollow flow valve part initially produced according to the procedure in Example 4. Within about 2 minutes the object started to turn green, and the object was then removed from the vat and returned to room temperature. The part was washed in warm soapy water and rinsed and dried. The object had turned uniformly green, which demonstrated that multiple processing in various colored mediums, such as the primary colors, can produce an object of any desired color.

EXAMPLE 6

Black SDM Object

A Color index (C.I.) dye soluble in alcohols, ketones, and esters sold under the designation Savinyl® Black RLSN available from Ciariant GmbH, Pigments & Additives Division, of Frankfurt, Germany, was mixed in a concentration of about one teaspoon per 500 ml of soy solvent. This particular dye had a C.I. index of S. BI. 45. The soy solvent Soygold® 2000 was used. The fluid medium comprising soy solvent and dye was placed in a heated vat maintained at a temperature of between about 45° C. and about 80° C. which is above the glass transition temperature of the polymer component of the sample parts. The cell phone shell and hollow flow valve were used as the sample parts. The SDM sample parts were then submersed into the vat and held in the vat for approximately 20 minutes before being removed and returned to room temperature. The parts were washed in warm soapy water and rinsed and dried. The sample parts changed from their generally opaque white appearance to a uniform black. The dye did not come off on the hands of persons handling the parts.

EXAMPLE 7

Blue Stereolithography Object

A soluble dye sold under the designation Oil Blue II available from Keystone Corporation of Santa Fe, Calif., was mixed in a concentration of about one teaspoon per 500 ml of liquid pyrrolidinone. The pyrrolidinone (1-methyl-2-5-pyrrolidinone) is available from Aldrich Chemical Company, Inc. of Milwaukee, Wis. Pyrrolidinone was selected since cured SL 7540 build material is very soluble in this liquid. The fluid medium comprising the pyrrolidinone and dye was placed in a heated vat and brought to a temperature above the glass transition temperature of the polymer component of the sample parts formed by stereolithography. The temperature of the vat was between about 90° C. and about 95° C. Sample parts were then submersed into the vat and held in the vat for approximately 2 hours before being removed and returned to room temperature. The parts were washed in warm soapy water and rinsed and dried. The sample parts changed from their generally translucent yellow appearance to a deep translucent blue. The dye did not come off on the hands of persons handling the parts. However, the processing substantially plasticized the sample objects and altered their mechanical properties. The parts became extremely flexible indicating that the pyrrolidinone liquid may need to be diluted so as to reduce the plasticizing effect occurring during processing.

EXAMPLE 8

Blue Stereolithography Object

Other sample parts formed by stereolithography were processed in the same blue dye solution discussed in Example 7 but with Soygold® 2000 as the solvent instead of pyrrolidinone. The temperature of the vat was increased to between about 165° C. and about 185° C. The clothing iron sample stereolithography object was submersed into the vat and held in the vat for approximately 2 hours before being removed and returned to room temperature. The iron was washed in warm soapy water and rinsed and dried. The iron changed from a generally translucent yellow appearance to a translucent light blue, however, the mechanical properties appeared to remain essentially unchanged. Thus, processing with pyrrolidinone produced more brightly colored object than processing with soy solvent but at the expense of altering the mechanical properties of the underlying objects.

EXAMPLE 9

Blue Laser Sintering Object

A soluble dye sold under the designation Oil Blue II available from Keystone Corporation of Santa Fe, Calif., was mixed in a concentration of about one teaspoon per 500 ml of soy solvent. The soy solvent Soyclear® 1500 was used. The fluid medium comprising soy solvent and dye were placed in a heated vat and brought to a temperature above the glass transition temperature of the polymer component of the sample parts formed by laser sintering. The temperature of the vat was between about 80° C. and about 95° C. The 2"×2" flat sheet sample objects were submersed into the vat and held in the vat for approximately two hours before being removed and returned to room temperature. The flat sheets were washed in warm soapy water and rinsed and dried. The sample parts changed from their generally opaque white appearance to a light blue. The dye did not come off on the hands of persons handling the parts.

All patents and other publications cited herein are incorporated by reference in their entirety. What has been described are preferred embodiments in which modifications and changes may be made without departing from the spirit and scope of the accompanying claims.

What is claimed is:

1. A method of altering the appearance of a three-dimensional object formed by a solid freeform fabrication apparatus, the three-dimensional object formed from a build material comprising at least one polymer component and having a surface and an internal volume, the method comprising the steps of:
   (a) applying a fluid medium to the three-dimensional object at a temperature above the glass transition temperature of the polymer component, the fluid medium carrying an infiltration agent and permeating the three-dimensional object at a temperature above a glass transition temperature of the polymer component;
   (b) maintaining the application of the fluid medium to the three-dimensional object to allow the infiltration agent to penetrate the three-dimensional object and colorize the entire internal volume of the object to thereby establish a desired appearance of the three-dimensional object; and
   (c) terminating the application of the fluid medium carrying the infiltration agent to the three-dimensional object.

2. The method of claim 1 wherein the solid freeform fabrication apparatus for forming the three-dimensional object is selected from the group consisting of a stereolithography apparatus, a selective deposition modeling apparatus, a laminated object manufacturing apparatus, a laser sintering apparatus, and combinations thereof.

3. The method of claim 1 wherein the step of applying the fluid medium to the three-dimensional object is achieved by submersing at least a portion of the three-dimensional object in a bath of the fluid medium.

4. The method of claim 1 wherein the fluid medium is selectively applied to only a portion of the three-dimensional object to alter the appearance of the portion of the three-dimensional object in which the fluid medium is selectively applied.

5. The method of claim 1 wherein the step of applying the fluid medium to the three-dimensional object is achieved by spraying the fluid medium on the three-dimensional object.

6. The method of claim 1 wherein the infiltration agent is a colorant.

7. The method of claim 1 wherein the infiltration agent is a colorant selected from the group of primary component colors consisting of cyan, magenta, yellow, black, and combinations thereof.

8. The method of claim 1 wherein the infiltration agent is phosphorescent.

9. The method of claim 1 wherein the infiltration agent is conductive.

10. The method of claim 1 wherein the polymer component is selected from the group consisting of a thermoplastic material, a thermosetting material, and combinations thereof.

11. The method of claim 1 wherein the polymer component comprises epoxies, acrylates, vinyl ethers, unsaturated polyesters, bismaleimides, and combinations thereof.

12. The method of claim 1 wherein the polymer component comprises nylon, carbon-hydrogen waxes, acrylics, Acrylonitrile Butadiene Styrene, polyimide resins, polycarbonates, polyurethanes, and combinations thereof.

13. The method of claim 1 wherein the fluid medium comprises alcohol, ketones, esters, pyrrolidinone, and combinations thereof.

14. The method of claim 1 wherein the fluid medium comprises fatty acid esters derived from organic oil-based fluids.

15. The method of claim 14 wherein the organic oil-based fluids are selected from the group consisting of linseed oil, soybean oil, castor oil, sunflower seed oil, tall oil, tung oil, corn oil, rapeseed oil, and combinations thereof.

16. A method of altering the appearance of a three-dimensional object formed by a solid freeform fabrication apparatus, the three-dimensional object formed from a build material comprising at least one polymer component, the method comprising the steps of:
   (a) applying a fluid medium to the three-dimensional object at a temperature above the glass transition temperature of the polymer component, the fluid medium carrying an infiltration agent and permeating the three-dimensional object at a temperature above a glass transition temperature of the polymer component;
   (b) maintaining the application of the fluid medium to the three-dimensional object to allow the infiltration agent to penetrate the three-dimensional object and establish a desired appearance of the three-dimensional object;
   (c) terminating the application of the fluid medium carrying the infiltration agent to the three-dimensional object; and
   (d) the infiltrating agent having the characteristic of one selected from the group consisting of phosphorescent, fluorescent, iridescent, conductive and combinations thereof.

* * * * *

UNITED STATES PATENT AND TRADEMARK OFFICE
CERTIFICATE OF CORRECTION

| | | |
|---|---|---|
| PATENT NO. | : 6,713,125 B1 | Page 1 of 1 |
| APPLICATION NO. | : 10/099839 | |
| DATED | : March 30, 2004 | |
| INVENTOR(S) | : Michael Thomas Sherwood et al. | |

It is certified that error appears in the above-identified patent and that said Letters Patent is hereby corrected as shown below:

Column 1
Line 63, should read --for example, U.S. Pat. No. 4,752,352 to Feygin. In another--

Column 2
Line 19, should read --jetting system such as an extruder or print head. One type of--

Column 6
Line 56, should read --by reference as set forth in full. It was determined from these--

Column 7
Line 64, should read --build material containing the polymer component may take the--

Column 8
Line 12, should read --tration agent that is selected to alter the appearance of the--

Line 39, should read --solid and liquid line of dyes sold under the Savinyl product--

Column 12
Line 18, should read --available from Clariant GmbH, Pigments & Additives--

Line 43, should read --Company, Inc. of Milwaukee, Wis. Pyrrolidinone was--

Signed and Sealed this

Twenty-ninth Day of January, 2008

JON W. DUDAS
*Director of the United States Patent and Trademark Office*